United States Patent
Matsuno et al.

(10) Patent No.: US 9,331,361 B2
(45) Date of Patent: *May 3, 2016

(54) NONAQUEOUS ELECTROLYTE SECONDARY BATTERY AND PRODUCTION METHOD THEREOF

(71) Applicant: KABUSHIKI KAISHA TOSHIBA, Minato-ku (JP)

(72) Inventors: Shinsuke Matsuno, Tokyo (JP); Hidesato Saruwatari, Kashiwazaki (JP); Dai Yamamoto, Kashiwazaki (JP); Asato Kondo, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 50 days.

This patent is subject to a terminal disclaimer.

(21) Appl. No.: 14/180,605

(22) Filed: Feb. 14, 2014

(65) Prior Publication Data

US 2014/0162117 A1     Jun. 12, 2014

Related U.S. Application Data

(63) Continuation of application No. PCT/JP2012/053078, filed on Feb. 10, 2012.

(30) Foreign Application Priority Data

Aug. 26, 2011    (JP) .................................. 2011-185191

(51) Int. Cl.
*H01M 10/0567*     (2010.01)
*H01M 10/04*     (2006.01)

(Continued)

(52) U.S. Cl.
CPC .......... *H01M 10/0567* (2013.01); *H01M 4/485* (2013.01); *H01M 4/62* (2013.01);
(Continued)

(58) Field of Classification Search
CPC   H01M 10/0567; H01M 10/052; H01M 10/04
See application file for complete search history.

(56) References Cited

U.S. PATENT DOCUMENTS

| 5,284,721 A | 2/1994 | Beard | |
|---|---|---|---|
| 6,045,594 A * | 4/2000 | Yanai et al. | .................. 29/623.1 |

(Continued)

FOREIGN PATENT DOCUMENTS

| CN | 101385094 A | 3/2009 |
|---|---|---|
| EP | 1 635 417 | 3/2006 |

(Continued)

OTHER PUBLICATIONS

International Preliminary Report on Patentability issued Mar. 13, 2014 in PCT/JP2012/053078 filed Feb. 10, 2012 (English translation only).

(Continued)

*Primary Examiner* — Stewart Fraser
(74) *Attorney, Agent, or Firm* — Oblon, McClelland, Maier & Neustadt, L.L.P

(57) ABSTRACT

According to the embodiment, there is provided a nonaqueous electrolyte secondary battery comprising a positive electrode; a negative electrode including a negative electrode active material layer; and a nonaqueous electrolyte. The negative electrode active material layer contains carbon dioxide and releases the carbon dioxide in the range of 0.01 ml to 3 ml per 1 g when heated at 400° C. for 1 minute. The nonaqueous electrolyte contains carbon dioxide of 50 ml/L to 1000 ml/L.

13 Claims, 1 Drawing Sheet

(51) Int. Cl.
*H01M 10/052* (2010.01)
*H01M 4/485* (2010.01)
*H01M 4/62* (2006.01)
*H01M 10/42* (2006.01)
*H01M 10/0525* (2010.01)
*H01M 4/04* (2006.01)

(52) U.S. Cl.
CPC .......... *H01M 10/04* (2013.01); *H01M 10/052* (2013.01); *H01M 10/4235* (2013.01); *H01M 4/0445* (2013.01); *H01M 10/0525* (2013.01); *Y02E 60/122* (2013.01); *Y02P 70/54* (2015.11); *Y10T 29/49108* (2015.01)

(56) References Cited

U.S. PATENT DOCUMENTS

| | | | |
|---|---|---|---|
| 6,183,908 | B1 | 2/2001 | Miyasaka et al. |
| 2005/0170250 | A1* | 8/2005 | Ohzuku et al. ............. 429/231.1 |
| 2008/0220331 | A1* | 9/2008 | Minami et al. ............. 429/218.1 |
| 2009/0065730 | A1 | 3/2009 | Yoshino et al. |
| 2010/0021819 | A1 | 1/2010 | Zhamu et al. |
| 2011/0206981 | A1 | 8/2011 | Jito et al. |
| 2012/0070717 | A1* | 3/2012 | Harada et al. ................. 429/156 |
| 2013/0316242 | A1 | 11/2013 | Matsuno et al. |
| 2013/0330627 | A1* | 12/2013 | Matsuno et al. ............. 429/223 |
| 2013/0330629 | A1* | 12/2013 | Matsuno et al. ........... 429/231.1 |

FOREIGN PATENT DOCUMENTS

| | | |
|---|---|---|
| JP | 8-162164 | 6/1996 |
| JP | 11-135121 | 5/1999 |
| JP | 11-339856 | 12/1999 |
| JP | 2001-185140 | 7/2001 |
| JP | 2002-216843 | 8/2002 |
| JP | 2003-7357 | 1/2003 |
| JP | 2005-190977 | 7/2005 |
| JP | 4038826 B2 | 1/2008 |
| JP | 2010-238387 | 10/2010 |
| JP | 2011-113735 | 6/2011 |
| WO | WO 2010109722 A1 * | 9/2010 |

OTHER PUBLICATIONS

Written Opinion issued Apr. 24, 2012 in PCT/JP2012/053078 filed Feb. 10, 2012 (English translation only).
Extended European Search Report issued Mar. 3, 2015 in Patent Application No. 12827453.7
Combined Chinese Office Action and Search Report issued May 22, 2015 in Patent Application No. 201280031502.X (with English language translation).
International Search Report issued Apr. 24, 2012 in PCT/JP2012/053078 filed Feb. 10, 2012.
European Search Report issued Feb. 22, 2016 in corresponding Application No. 12 827 453.7.
Office Action issued Jan. 15, 2016 in Chinese Patent Application No. 201280031502.X.

* cited by examiner

NONAQUEOUS ELECTROLYTE SECONDARY BATTERY AND PRODUCTION METHOD THEREOF

CROSS-REFERENCE TO RELATED APPLICATIONS

This application is a Continuation of PCT/JP2012/053078, filed on Feb. 10, 2012. This application is based upon and claims the benefit of priority from prior Japanese Patent Application No. 2011-185191, filed Aug. 26, 2011, the entire contents of which are incorporated herein by reference.

FIELD

Embodiments described herein relate to a nonaqueous electrolyte secondary battery and a production method thereof.

BACKGROUND

It is known that a Solid Electrolyte Interface (SEI) coating (hereinafter referred to as a coating) is present on the surface of a negative electrode active material included in a nonaqueous electrode secondary battery. This coating is formed due to the reductive decomposition of an electrolyte on a negative electrode at the time of an initial charge and discharge. The subsequent reaction between the electrolyte and the negative electrode is suppressed by the formation of the coating.

Recently, a nonaqueous electrolyte secondary battery using lithium titanate as a negative electrode active material has been developed. A lithium ion inserted/released potential inherent to the negative electrode in the nonaqueous electrolyte secondary battery is higher than that inherent to the negative electrode used in the conventional batteries. Therefore, the coating is hardly formed on the surface of the negative electrode active material. In such a battery, the decomposition reaction of the electrolyte is not suppressed because of the insufficient formation of the coating. In particular, when the battery is stored in a state close to a full charge at a high temperature, the decomposition reaction of the electrolyte is increased. Thus, there is a problem that gas generation due to the decomposition of the electrolyte is increased, resulting in the expansion of the battery. There is also a problem that the capacity retention ratio due to the rise of the internal resistance is decreased.

CITATION LIST

Patent literature 1: JP-A No. 2002-216843
Patent literature 2: JP-A NO. 11-339856

DETAILED DESCRIPTION

There is provided a nonaqueous electrolyte secondary battery showing a suppression of expansion and resistance rise as well as an improvement in capacity retention ratio.

In one aspect of the present embodiments, there is provided a nonaqueous electrolyte secondary battery comprising a positive electrode; a negative electrode including a negative electrode active material layer; and a nonaqueous electrolyte. The negative electrode active material layer contains carbon dioxide and releases the carbon dioxide in the range of 0.01 ml to 3 ml per 1 g when heated at 400° C. for 1 minute. The nonaqueous electrolyte contains carbon dioxide of 50 ml/L to 1000 ml/L.

In another aspect, there is provided a method for producing a nonaqueous electrolyte secondary battery. The method comprises:

washing a negative electrode active material powder with water;

drying the washed negative electrode active material powder under heating in an inert gas atmosphere;

preparing a slurry containing the negative electrode active material powder after the heating, in an atmosphere of a dew point of −15° C. or less;

producing a negative electrode using the slurry, in an atmosphere of a dew point of −15° C. or less;

dissolving carbon dioxide in a nonaqueous electrolyte at a concentration of 50 ml/L to 1000 ml/L; and assembling a nonaqueous electrolyte secondary battery by using the negative electrode, the nonaqueous electrolyte in which carbon dioxide is dissolved, and the positive electrode, in an atmosphere of a dew point of −15° C. or less.

Hereinafter, embodiments will be explained with reference to the drawings.

Figure 1:
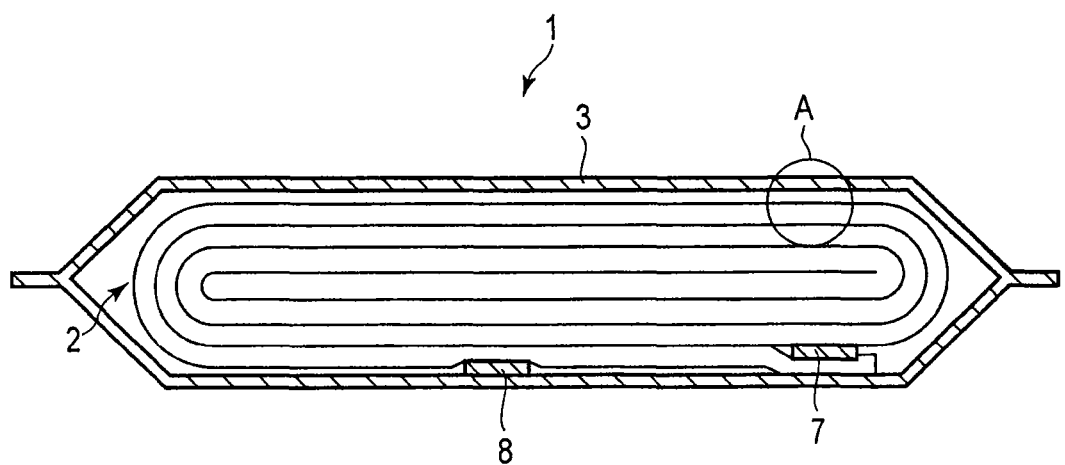
FIG. 1 is a schematic cross-sectional view of a nonaqueous electrolyte secondary battery according to the embodiment.
Figure 2:
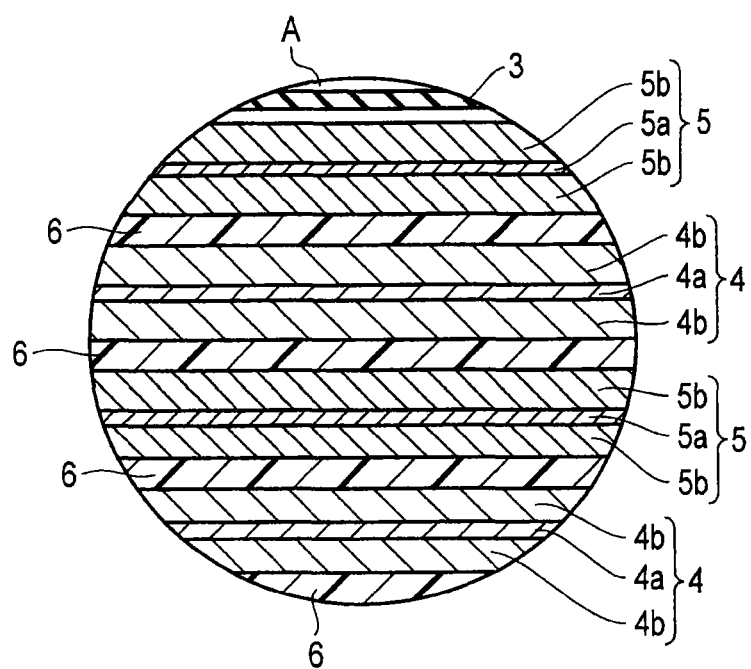
FIG. 2 is an enlarged sectional view of section A shown in FIG. 1.

FIG. 1 is a schematic cross-sectional view of a flat type nonaqueous electrolyte secondary battery. FIG. 2 is an enlarged sectional view of section A of FIG. 1. A battery 1 comprises a wound electrode group 2. The wound electrode group 2 is accommodated in a container 3. A nonaqueous electrolyte (not shown) is also filled in the container 3.

The wound electrode group 2 is a laminate as shown in FIG. 2, wherein a separator 6 is interposed between a positive electrode 4 and a negative electrode 5. A flat type wound electrode group is obtained by winding the laminate spirally and pressing it.

As shown in FIG. 1, in the vicinity of the end of outmost layer of the wound electrode group 2, a positive electrode terminal 7 is connected to the positive electrode 4, and a negative electrode terminal 8 is connected to the negative electrode 5. A baggy container made of a laminate film is used for the container 3. The wound electrode group 2 and the nonaqueous electrolyte are sealed by heat-sealing an opening of the baggy container made of a laminate coating, in the state where the positive electrode terminal 7 and the negative electrode terminal 8 are extended through the opening. In addition, the container 3 is not limited to the baggy container made of a laminate coating, and, for example, it is also possible to use a metal can for such purpose.

The positive electrode 4 comprises a positive electrode current collector 4a and a positive electrode active material layer 4b. The positive electrode active material layer 4b contains a positive electrode active material and optionally a conductive agent and a binder. The positive electrode active material layer 4b is formed on one or both surfaces of the positive electrode current collector 4a.

Examples of the positive electrode active material include a lithium manganese composite oxide, a lithium nickel composite oxide, and a lithium-containing phosphate compound.

Examples of the lithium manganese composite oxide include a composite oxide such as $LiMn_2O_4$, and a lithium manganese composite oxide containing hetero element which a part of Mn is substituted by the hetero element, such as $Li(Mn_xAl_y)_2O_4$ (wherein x+y=1).

Examples of the lithium nickel composite oxide include an oxide such as $LiNiO_2$, and a lithium nickel composite oxide containing hetero element which a part of Ni is substituted by the hetero element, such as $Li(Ni_xMn_yCo_z)O_2$ and $Li(Ni_xCo_y\text{-}Al_z)O_2$ (wherein x+y+z=1).

Examples of the lithium-containing phosphate compound include a phosphate such as $LiFePO_4$, and a lithium-containing phosphate containing hetero element which a part of Fe is substituted by the hetero element, such as $Li(Fe_xMn_y)PO_4$ (wherein x+y=1).

Examples of the conductive agent include a carbonaceous material such as acetylene black, carbon black, and graphite.

Examples of the binder include polytetrafluoroethylene (PTFE), polyvinylidene fluoride (PVdF), fluorine-based rubber, ethylene-butadiene rubber (SBR), polypropylene (PP), polyethylene (PE), and carboxymethyl cellulose (CMC).

The positive electrode active material layer 4b preferably contains the positive electrode active material, the conductive agent and the binder at a ratio of 80 to 95% by mass, 3 to 18% by mass, and 2 to 7% by mass, respectively.

A metal foil is used as the positive electrode current collector 4a. As the metal, aluminum or an aluminum alloy containing one or more elements selected from the group consisting of Mg, Ti, Zn, Mn, Fe, Cu and Si is suitably used.

The negative electrode 5 comprises a negative electrode current collector 5a and a negative electrode active material layer 5b. The negative electrode active material layer 5b contains a negative electrode active material and optionally a conductive agent and a binder. The negative electrode active material layer 5b is formed on one or both surfaces of the negative electrode current collector 5a.

The negative electrode 5 contains carbon dioxide. Carbon dioxide is contained mainly in the negative electrode active material layer 5b. The negative electrode active material layer contains carbon dioxide in an amount capable of releasing the carbon dioxide of 0.01 ml to 3 ml per 1 g when heated at 400° C. for 1 minute.

Examples of the negative electrode active material include a lithium titanium composite oxide and a titanium oxide. The lithium ion inserted potential of these oxides is preferably equal to or greater than 0.4 V (versus $Li/Li^+$). Examples of the oxide having a lithium ion inserted potential of 0.4 V or more (versus $Li/Li^+$) include a lithium titanate ($Li_{4+x}Ti_5O_{12}$) having a spinel structure and a lithium titanate ($Li_{2+x}Ti_3O_7$) having a ramsdellite structure. Here, x is all in the range of 0 to 3. The lithium is inserted to the titanium oxide (for example, $TiO_2$) by charge and discharge of the battery and thus, the titanium oxide is converted into lithium titanium oxide.

The negative electrode active material may contain any one of the above oxides, but may contain two or more oxides.

The average primary particle diameter of the negative electrode active material is preferably 5 µm or less. The negative electrode active material having an average primary particle diameter of 5 µm or less has a sufficient surface area. Thus, such a negative electrode active material has superior large current discharge performance.

The negative electrode active material preferably has a specific surface area of 1 to 10 $m^2/g$. The negative electrode active material having a specific surface area of 1 $m^2/g$ or more has a sufficient surface area. Thus, such a negative electrode active material has superior large current discharge performance. The negative electrode active material having a specific surface area of 10 $m^2/g$ or less has a low reactivity with the nonaqueous electrolyte. Accordingly, in such a negative electrode active material, decrease in charge and discharge efficiency as well as gas generation during storage can be suppressed.

Examples of the conductive agent include a carbonaceous material, such as acetylene black, carbon black, and graphite. It is preferable to use a carbonaceous material having a high absorption of alkali metal and a high conductivity.

Examples of the binder include polytetrafluoroethylene (PTFE), polyvinylidene fluoride (PVdF), fluorine-based rubber, styrene-butadiene rubber (SBR), polypropylene (PP), polyethylene (PE), and carboxymethyl cellulose (CMC).

The negative electrode active material layer 5b preferably contains the negative electrode active material, the conductive agent, and the binder at a ratio of 70 to 95% by mass, 0 to 25% by mass, and 2 to 10% by mass, respectively.

A metal foil is used as the negative electrode current collector 5a. As the metal, aluminum, an aluminum alloy containing one or more elements selected from the group consisting of Mg, Ti, Zn, Mn, Fe, Cu and Si, or copper is suitably used.

The nonaqueous electrolyte is prepared by dissolving an electrolyte in a nonaqueous solvent. The concentration of the electrolyte in the nonaqueous solvent is preferably 0.5 to 2 mol/L.

The nonaqueous electrolyte contains carbon dioxide of 50 ml/L to 1000 ml/L.

The known nonaqueous solvents used in lithium batteries can be used. Examples of the nonaqueous solvent include a cyclic carbonate such as ethylene carbonate (EC) and propylene carbonate (PC); and a mixed solvent of a cyclic carbonate and a nonaqueous solvent having a lower viscosity than the cyclic carbonate (hereinafter referred to as "second solvent").

Examples of the second solvent include a linear carbonate (e.g., dimethyl carbonate (DMC), methyl ethyl carbonate (MEC) or diethyl carbonate (DEC); γ-butyrolactone (GBL), acetonitrile, methyl propionate, ethyl propionate; a cyclic ether (e.g., tetrahydrofuran or 2-methyltetrahydrofuran); and a linear ether (e.g., dimethoxyethane or diethoxyethane).

As the nonaqueous solvent, a mixed solvent containing propylene carbonate and diethyl carbonate is preferable. Such a mixed solvent is suitably used because it has a nature to dissolve carbon dioxide and carbon monoxide and has a high oxidation resistance.

Examples of the electrolyte include an alkali salt. Preferably, a lithium salt is used. Examples of the lithium salt include lithium hexafluorophosphate ($LiPF_6$), lithium tetrafluoroborate ($LiBF_4$), lithium hexafluoroarsenate ($LiAsF_6$), lithium perchlorate ($LiClO_4$), and lithium trifluoromethanesulfonate ($LiCF_3SO_3$). Lithium hexafluorophosphate ($LiPF_6$) or lithium tetrafluoroborate ($LiBF_4$) is preferably used.

A separator 6 prevents the positive electrode 4 and the negative electrode 5 from physical and electrical contact. The separator 6 is comprised of an insulating material, and has a shape enabling an electrolyte to permeate through it. The separator 6 may be formed from, for example, a non-woven fabric made of synthetic resin, a porous polyethylene film, a porous polypropylene film, or a cellulose-based separator.

According to the embodiment, the battery expansion and the battery resistance increase can be suppressed by allowing the negative electrode active material and the nonaqueous electrolyte to contain carbon dioxide in the amount described above. The capacity retention ratio can also be suppressed by such an amount of carbon dioxide.

Carbon dioxide is contained in the negative electrode active material layer as an impurity. The carbon dioxide is contained in a state of being adsorbed on an active material, or as a compound such as lithium carbonate (for example, $Li_2CO_3$). Further, it should be noted here that the lithium carbonate includes lithium hydrogen carbonate ($(LiH)_2CO_3$) wherein a part of lithium is substituted by H.

Carbon dioxide contained in the negative electrode active material layer gasifies as a result of reduction on the surface of the active material when a battery is charged and discharged. By decreasing the amount of carbon dioxide contained in the negative electrode active material layer, it is possible to decrease the amount of gas generation. However, when the amount of carbon dioxide is decreased, the coating is less likely to be formed on the surface of the negative electrode active material. If the coating is not formed, the reaction between the electrolyte and the negative electrode is increased. As a result, gas generation is promoted to expand the battery. In addition, the internal resistance rises to deteriorate the capacity.

Accordingly, in the embodiment, a negative electrode active material layer having a low content of carbon dioxide is used, while a nonaqueous electrolyte containing carbon dioxide is used. This enables to form a moderate coating on the surface of the negative electrode active material while suppressing gas generation. Thus, the battery expansion as well as the resistance rise is suppressed. In this way, the capacity retention ratio of the battery is improved.

The amount of gas generated is decreased when the negative electrode active material layer contains carbon dioxide in the above range. If the carbon dioxide content is too much, the amount of gas generated during charge and discharge is increased. If the carbon dioxide content is too small, a sufficient coating is not formed on the surface of the negative electrode active material.

A moderate coating is formed on the surface of the negative electrode active material when the nonaqueous electrolyte contains carbon dioxide in the above range. If the carbon dioxide content is too much, carbon dioxide becomes a factor causing gas generation. If the carbon dioxide content is too small, a sufficient coating is not formed on the surface of the negative electrode active material.

The nonaqueous electrolyte preferably further contains carbon monoxide. The amount of carbon monoxide contained in the nonaqueous electrolyte is preferably 5 ml/L to 100 ml/L.

A coating formation on the surface of the negative electrode active material is promoted when the nonaqueous electrolyte contains carbon monoxide in the above range. If the content of carbon monoxide is too small, a coating formation is difficult to occur on the surface of the negative electrode active material. If the content of carbon monoxide is too much, the carbon monoxide gas may generate. In this case, the cell may be expanded.

In addition, a circulation of carbon dioxide and carbon monoxide in the nonaqueous electrolyte is promoted by containing carbon dioxide together with carbon monoxide in the nonaqueous electrolyte. In this way, the capacity deterioration is further suppressed. This is believed to be due to the following reasons.

A part of carbon dioxide is reduced on the surface of the negative electrode to carbon monoxide. On the other hand, a part of carbon monoxide is oxidized on the surface of the positive electrode to carbon dioxide. In this way, during halts other than charge/discharge cycles, oxidation-reduction of carbon dioxide occurs on the surface of the electrode. Therefore, the reaction between the electrode and the electrolyte is suppressed, resulting in the suppression of the decomposition of the electrolyte. Because the decomposition of the electrolyte is suppressed, the capacity deterioration is suppressed. Therefore, the capacity retention ratio is improved.

In addition, carbon monoxide has a lower solubility than carbon dioxide. The ratio of the carbon dioxide content in the nonaqueous electrolyte to the carbon monoxide content is about 10 to 50. Although this ratio varies depending on the use conditions of the battery, it is maintained within this range even after repeated charge/discharge cycles.

The amount of carbon dioxide generated from the negative electrode is measured by gas chromatography (GC). The GC measurement can be carried out as follows.

Using a spatula or the like, several mg of the negative electrode active material layer is scraped out from the negative electrode, and placed in a measurement container. This operation is carried out in an inert gas atmosphere. For example, the operation may be carried out in a glove box. An inert gas such as nitrogen and argon other than carbon dioxide is used as the inert gas. Then, the measurement container is introduced into a device while maintaining the inert gas atmosphere, and the amount of carbon dioxide generated when the container is heated at 400° C. for 1 minute is measured. The measurement is performed while maintaining the inert gas atmosphere so that the active material layer does not adsorb carbon dioxide and moisture. The humidity in the inert gas atmosphere is controlled so that moisture is prevented from being adsorbed on a sample, and, for example, the dew point is kept at −70° C. or less. It should be noted that the dew point refers to a temperature at which a partial water vapor pressure in the air equals a saturation pressure, and as used herein, the dew point is defined, regarding for both air and inert gas, as a temperature at which a partial water vapor pressure in the gas equals a saturation pressure when the temperature is lowered under a constant pressure.

The measurement for the negative electrode active material layer contained in the nonaqueous electrolyte secondary battery is performed as follows. At first a battery is dismantled in an inert gas atmosphere to take out a negative electrode. This negative electrode is washed with methyl ethyl carbonate (MEC) for 10 minutes. Then, the negative electrode is dried under a reduced pressure atmosphere of −80 kPa at room temperature for 1 hour without atmospheric exposure. Then, in the same manner as described above, the active material layer is collected and measured.

Further, when the heating temperature is too high, carbon dioxide derived from other ingredients is detected. For example, when heated at 500° C. or more, combustion of the binder occurs to generate carbon dioxide, or influence of the conductive agent such as carbon black occurs. Thus, the heating temperature is preferably around 400° C.

The amount of carbon dioxide contained in the nonaqueous electrolyte is measured by GC. The GC measurement can be carried out as follows. A nonaqueous electrolyte is directly extracted using a microsyringe under an inert atmosphere. The extracted electrolyte is served as a sample. This sample is heated at 200° C. for 1 minute to measure the amount of carbon dioxide generated. An inert gas similar to those described above can be used. In addition, there is a possibility of detecting carbon dioxide derived from other ingredients contained in the nonaqueous electrolyte when the heating temperature is too high. Therefore, the heating temperature is preferably about 200° C.

The amount of carbon monoxide contained in the nonaqueous electrolyte can be measured in the same manner as described for the measurement of the carbon dioxide content.

Further, the above-mentioned GC measurement is carried out on a battery, a negative electrode and a nonaqueous electrolyte before the initial charge. In addition, the active material layer is collected from a negative electrode in a state having a potential of 2.5 V to 3.5 V relative to metallic lithium. If an active material layer is collected from a negative electrode having a potential outside the above range, for example, a negative electrode in charged state, the results of the measurement will vary.

(Production Method)

Next, a method for producing a nonaqueous electrolyte secondary battery will be explained.

It has been confirmed by the present inventors that carbon dioxide adsorbed on a negative electrode reacts with moisture to easily form lithium carbonate. In particular, a negative electrode active material layer containing a lithium titanium composite oxide as the negative electrode active material easily forms lithium carbonate by the reaction of carbon dioxide with moisture adsorbed on the surface of the active material layer and lithium in the active material layer. Therefore, it is preferable to reduce the moisture content of the atmosphere during the production process.

The negative electrode active material produced by the conventional solid-phase method contains large amounts of carbon dioxide and moisture that have been adsorbed thereon. If a negative electrode active material containing a lot of carbon dioxide is used, lithium carbonate is likely to be produced in the production of a negative electrode, depending on the environment during the production. Thus, at first, the negative electrode active material is washed with water and then carbon dioxide existing particularly as a compound such as lithium carbonate is removed. Then, degassing and drying are carried out by heating the negative electrode active material. In this way, it is possible to remove the carbon dioxide and moisture from the negative electrode active material.

The washing time may range, but are not limited to, from 10 minutes to 3 hours. In order to suppress re-adsorption of carbon dioxide, the degassing and drying are carried out in an inert gas atmosphere. Argon and nitrogen can be used as the inert gas. The heating temperature is preferably in the range of 450° C. to 750° C., and more preferably in the range of 500° C. to 700° C. The heating time is preferably in the range of 5 to 24 hours. In addition, it is preferable to carry out the degassing and drying under an atmosphere of low humidity, in order to suppress re-adsorption of moisture.

Then, in an atmosphere of a dew point of −15° C. or less, the negative electrode active material powder after the heating, a conductive agent and a binder are suspended in a suitable solvent to prepare a slurry. As the solvent, for example, N-methylethylpyrrolidone can be used. This slurry is applied to one or both surfaces of a negative electrode current collector, and then dried to form a negative electrode active material layer. Then, by pressing the negative electrode active material layer together with the negative electrode current collector, a negative electrode can be produced. Production of the negative electrode is carried out under an atmosphere of a dew point of −15° C. or less. The preparation of the slurry and the production of the negative electrode may be carried out under an atmosphere of air or inert gas. The prepared slurry and the produced negative electrode are preferably placed under an atmosphere of a dew point of −10° C. or less in order to prevent adsorption of moisture.

A positive electrode can be produced as follows. First, a positive electrode active material, a conductive agent and a binder are suspended in a suitable solvent to prepare a slurry. As the solvent, for example, N-methylethylpyrrolidone can be used. This slurry is applied to one or both surfaces of a positive electrode current collector and dried to form a positive electrode active material layer. Then, the positive electrode active material layer is rolled together with the current collector.

Using the negative electrode and positive electrode produced above and a separator, an electrode group is produced. The positive electrode, a first separator, the negative electrode, and a second separator are laminated in this order to produce a laminate. This laminate is spirally wound so that the negative electrode is positioned on the outermost periphery. The wound laminate is pressed under heating. In this way, a flat-shaped electrode group is obtained.

On the other hand, an electrolyte is dissolved in a nonaqueous solvent, thereby to prepare a nonaqueous electrolyte. Then, carbon dioxide is dissolved in the nonaqueous electrolyte at a concentration of 50 ml/L to 1000 ml/L. Carbon monoxide is optionally dissolved in the nonaqueous electrolyte at a concentration of 5 ml/L to 100 ml/L. Carbon monoxide may be dissolved together with carbon dioxide at the same time or may be dissolved alone. Dissolution of carbon dioxide and carbon monoxide may be carried out by the well-known method. For example, such dissolution can be carried out by bubbling. The concentration of each of carbon dioxide and carbon monoxide in the nonaqueous electrolyte can be adjusted by varying the gas flow rate, the bubbling time, and the amount of the nonaqueous electrolyte.

A battery can be produced by accommodating the electrode group produced above in a baggy container, injecting a nonaqueous electrolyte therein, and sealing the baggy container.

Production of the electrode group and assembly of the battery are carried out in an atmosphere of a dew point of −15° C. or less. These processes may be carried out in an atmosphere of air or inert gas. It is possible to reduce the amount of carbon dioxide contained in the negative electrode by controlling the concentration of carbon dioxide and the humidity (dew point) in the atmosphere, and further the drying temperature of the electrode. Argon or nitrogen can be used as an inert gas.

Further, by subjecting the produced battery to an aging treatment, it is possible to promote a coating formation on the surface of the negative electrode. The aging treatment is, but not limited to, carried out preferably in the temperature range of 10° C. to 65° C. for a period of one hour to one week. The thickness of the coating can be adjusted by varying the aging treatment conditions such as times and temperatures.

In addition, adsorption of carbon dioxide onto the negative electrode active material will vary depending on the type, surface area, and composition of compounds used as a negative electrode active material. Therefore, even by using a combination of different compounds as the negative electrode active material, it is possible to control the amount of carbon dioxide contained in the negative electrode active material layer.

It is thought that carbon dioxide released when the negative electrode active material layer is heated at 400° C. is derived from carbon dioxide adsorbed on the negative electrode as well as from carbon dioxide existing as a compound such as lithium carbonate. It has been confirmed that all of these carbon dioxides are eluted in an electrolyte. When a nonaqueous electrolyte contains carbon dioxide, the elution amount of carbon dioxide is decreased. From this, it is considered that carbon dioxide contained in the nonaqueous electrolyte and carbon dioxide contained in the negative electrode are each in a state of equilibrium.

Thus, it is also possible to produce a battery wherein the amount of carbon dioxide released when the negative electrode active material layer is heated at 400° C. for 1 minute is 0.01 ml to 3 ml per 1 g of the negative electrode active material layer and the nonaqueous electrolyte contains carbon dioxide at a concentration of 50 ml/L to 1000 ml/L, by containing an excess amount of carbon dioxide in the negative electrode and eluting the carbon dioxide into the nonaqueous electrolyte. However, it is preferable to dissolve carbon dioxide, etc. in a nonaqueous electrolyte in advance because the concentration distribution of carbon dioxide in the thickness direction (i.e., the direction of from the surface to the current collector) of the negative electrode active material layer is easy to become uniform.

According to the embodiments described above, it is possible to provide a nonaqueous electrolyte secondary battery showing a suppression of expansion and resistance rise as well as an improvement in capacity retention ratio.

EXAMPLES

Example 1

Production of Negative Electrode

A powder of lithium titanium oxide ($Li_4Ti_5O_{12}$) having a spinel structure was prepared as a negative electrode active material. The $Li_4Ti_5O_{12}$ has a lithium ion inserted potential of 1.55 V (versus $Li/Li^+$). The $Li_4Ti_5O_{12}$ powder was washed with water for 30 minutes. Then, the powder was heated at 700° C. for 12 hours in an argon gas atmosphere.

The $Li_4Ti_5O_{12}$ powder after the heat treatment, graphite, and PVdF were added to NMP at a ratio of 90% by mass, 5% by mass, and 5% by mass, respectively, and mixed using glass beads for 30 minutes to prepare a slurry for negative electrode.

The slurry for negative electrode was applied to both surfaces of an aluminum foil (a current collector) having a thickness of 12 μm, and dried to form a negative electrode active material layer. The negative electrode active material layer was pressed together with the current collector to produce a negative electrode. The density of the negative electrode active material layer was 2.0 g/cm³.

The preparation of the slurry, application, drying and pressing were carried out in the air having a dew point of −15° C.

<Measurement of Amount of Carbon Dioxide Contained in Negative Electrode>

The amount of carbon dioxide contained in the produced negative electrodes was measured. First, the negative electrode active material layer was separated from the aluminum foil in an inert gas atmosphere of −70° C., and a portion of the negative electrode active material layer (containing the conductive agent and the binder) was collected and then subjected to GC measurement. The measurement was performed under the conditions of heating at 400° C. for 1 minute to measure the amount of released carbon dioxide. The amount of released carbon dioxide was 1.8 ml per 1 g of the negative electrode active material layer.

<Production of Positive Electrode>

A lithium-nickel-manganese-cobalt composite oxide ($LiNi_{0.33}Mn_{0.33}Co_{0.33}O_2$) powder, acetylene black, graphite, and polyvinylidene fluoride (PVdF) were added to NMP at a ratio of 91% by mass, 2.5% by mass, 3% by mass, and 3.5% by mass, respectively, and mixed, thereby to prepare a slurry for positive electrode.

The slurry for positive electrode was applied to both surfaces of an aluminum foil (a current collector) having a thickness of 12 μm, and dried to form a positive electrode active material layer. A positive electrode was produced by pressing the positive electrode active material layer together with the current collector. The density of the positive electrode active material layer was 3.0 g/cm³.

<Production of Electrode Group>

An electrode group was produced using the positive electrode and the negative electrode produced above and a porous polyethylene film as a separator having a thickness of 20 μm. A laminate was produced by laminating the positive electrode, a first separator, the negative electrode, and a second separator in this order. This laminate was spirally wound so that the negative electrode was positioned on the outermost periphery. The wound laminate was pressed while heating at 90° C. to produce a flat wound electrode group. The dimensions of the electrode group were 58 mm in width, 95 mm in height, and 3.0 mm in thickness.

The obtained electrode group was accommodated in a baggy container, and dried under vacuum at 80° C. for 24 hours. The container was formed from a laminate film having a thickness of 0.1 mm that was comprised of an aluminum foil having a thickness of 40 μm and a polypropylene layer formed on both surfaces of the aluminum foil.

The production of the electrode group was carried out in the air having a dew point of −15° C.

<Preparation of Nonaqueous Electrolyte>

Propylene carbonate (PC) and diethyl carbonate (DEC) were mixed in a volume ratio of 1:2 to prepare a mixed solvent. Lithium hexafluorophosphate ($LiPF_6$) was dissolved in the mixed solvent at a concentration of 1.0 mol/L to prepare a nonaqueous electrolyte.

The bubbling of carbon dioxide and carbon monoxide into the prepared electrolyte was performed at a constant flow rate. Then, by placing the electrolyte under a reduced pressure, the amount of each of carbon dioxide and carbon monoxide in the electrolyte was adjusted.

When the amount of gas contained in the obtained electrolyte was measured by gas chromatography, the concentration of carbon dioxide was 128 ml/L, and the concentration of carbon monoxide was 39 ml/L.

<Production of Battery>

The nonaqueous electrolyte was injected into a container in which an electrode group had been accommodated, and then sealed to produce a nonaqueous electrolyte secondary battery as shown in FIG. 1. This battery had a capacity of 3 Ah.

Assembly of the battery was carried out in the air having a dew point of −15° C.

The produced battery was subjected to one charge and discharge cycle at 0.2 C rate and was charged again to SOC 100% followed by aging at 35° C. for 8 hours. This aging promoted to form a coating on the surface of the electrode.

Examples 2 to 9

A battery was produced in the same manner as in Example 1, except that the washing time and heating conditions of the negative electrode active material powder; the content of carbon dioxide in the negative electrode; the contents of carbon dioxide and carbon monoxide in the nonaqueous electrolyte; the composition of the mixed solvent for the nonaqueous electrolyte; and the aging conditions were changed as shown in Table 1 and Table 2.

Comparative Examples 1 to 6

A battery was produced in the same manner as in Example 1, except that the washing time and heating conditions of the negative electrode active material powder; the content of carbon dioxide in the negative electrode; the contents of carbon dioxide and carbon monoxide in the nonaqueous electrolyte; and the aging conditions were changed as shown in Table 1 and Table 2. However, in Comparative Examples 1 to 2 and 4 to 6, the bubbling of carbon dioxide and carbon monoxide into the electrolyte do not performed. In Comparative Example 3, the bubbling of only carbon dioxide was performed.

TABLE 1

| | Washing time of active material powder | Heating conditions of active material powder | Amount of released $CO_2$ (mg/g-negative electrode active material layer) |
|---|---|---|---|
| Example 1 | 30 minutes | 700° C. 12 hours | 1.80 |
| Example 2 | 15 minutes | 450° C. 5 hours | 3.00 |
| Example 3 | 1 hours | 750° C. 24 hours | 0.01 |
| Example 4 | 15 minutes | 550° C. 6 hours | 1.62 |
| Example 5 | 15 minutes | 650° C. 5 hours | 0.61 |
| Example 6 | 20 minutes | 700° C. 6 hours | 0.32 |
| Example 7 | 30 minutes | 700° C. 12 hours | 1.80 |
| Example 8 | 30 minutes | 700° C. 12 hours | 1.80 |
| Example 9 | 30 minutes | 700° C. 12 hours | 1.80 |
| Comparative Example 1 | No treatment | No treatment | 3.84 |
| Comparative Example 2 | No treatment | No treatment | 3.84 |
| Comparative Example 3 | No treatment | No treatment | 3.84 |
| Comparative Example 4 | 30 minutes | 700° C. 12 hours | 1.80 |
| Comparative Example 5 | 30 minutes | 700° C. 12 hours | 1.80 |
| Comparative Example 6 | 3 hours | 800° C. 24 hours | 0.005 or less |

TABLE 2

| | Content of $CO_2$ in electrolyte | Content of CO in electrolyte | Solvent of electrolyte (volume ratio) | Aging conditions |
|---|---|---|---|---|
| Example 1 | 128 ml/L | 39 ml/L | PC:DEC = 1:2 | SOC 100% 35° C. 8 hours |
| Example 2 | 102 ml/L | 42 ml/L | PC:DEC = 1:2 | SOC 100% 35° C. 8 hours |
| Example 3 | 135 ml/L | 33 ml/L | PC:DEC = 1:2 | SOC 100% 35° C. 8 hours |
| Example 4 | 208 ml/L | Not detected | EC:PC:DEC = 0.5:0.5:2 | SOC 100% 35° C. 8 hours |
| Example 5 | 1000 ml/L | 100 ml/L | EC:PC:MEC:DEC = 1:1:1:1 | SOC 100% 35° C. 8 hours |
| Example 6 | 50 ml/L | 5 ml/L | EC:PC:GBL = 1:1:2 | SOC 100% 35° C. 8 hours |
| Example 7 | 128 ml/L | 39 ml/L | EC:PC:EMC:DEC = 1:1:1:1 | SOC 50% 65° C. 1 hour |
| Example 8 | 128 ml/L | 39 ml/L | EC:PC:DMC:DEC = 1:1:1:1 | SOC 50% 10° C. 168 hours |
| Example 9 | 128 ml/L | 39 ml/L | EC:PC:DMC:DEC = 1:1:1:1 | No aging |
| Comparative Example 1 | Not detected | Not detected | PC:DEC = 1:2 | No aging |
| Comparative Example 2 | Not detected | Not detected | PC:DEC = 1:2 | SOC 100% 35° C. 8 hours |
| Comparative Example 3 | 120 ml/L | Not detected | PC:DEC = 1:2 | SOC 100% 35° C. 8 hours |
| Comparative Example 4 | Not detected | Not detected | PC:DEC = 1:2 | No aging |
| Comparative Example 5 | Not detected | Not detected | PC:DEC = 1:2 | SOC 100% 35° C. 8 hours |
| Comparative Example 6 | Not detected | Not detected | PC:DEC = 1:2 | SOC 100% 35° C. 8 hours |

<Charge and Discharge Test>

For each of the batteries of Examples 1 to 9 and Comparative Examples 1 to 6, the discharge capacity at 1 C rate at 30° C., as well as the thickness of the battery and the direct current resistance in a state of SOC 50% was measured.

Then, 3000 charge/discharge cycles were performed at 10 C rate in the range of 20% to 80% SOC in an environment of 60° C. (one cycle means one charging and one discharging). The thickness of the battery and the direct current resistance after the cycle were measured, and the change ratio (Expansion ratio) of the thickness and the Resistance rise ratio before and after the cycle were calculated.

The discharge capacity was again measured at 1 C rate at 30° C. and the capacity retention ratio after the cycle (capacity after the cycle/capacity before the cycle) was calculated. The results are shown in Table 3.

TABLE 3

|  | Expansion ratio (times) | Resistance rise ratio (times) | Capacity retention ratio (%) |
|---|---|---|---|
| Example 1 | 1.12 | 1.83 | 85 |
| Example 2 | 1.20 | 1.78 | 82 |
| Example 3 | 1.01 | 1.75 | 86 |
| Example 4 | 1.10 | 1.83 | 78 |
| Example 5 | 1.18 | 1.71 | 83 |
| Example 6 | 1.03 | 1.72 | 81 |
| Example 7 | 1.13 | 1.64 | 88 |
| Example 8 | 1.14 | 1.88 | 89 |
| Example 9 | 1.14 | 1.93 | 84 |
| Comparative Example 1 | 1.43 | 2.65 | 73 |
| Comparative Example 2 | 1.46 | 2.53 | 67 |
| Comparative Example 3 | 1.48 | 1.65 | 78 |
| Comparative Example 4 | 1.08 | 2.83 | 72 |
| Comparative Example 5 | 1.08 | 2.68 | 70 |
| Comparative Example 6 | 1.02 | 3.23 | 68 |

All of the batteries according to Examples 1 to 9 showed a lower Expansion ratio than the batteries according to Comparative Examples 1 to 3. It was shown that the amount of gas generated after the cycle was suppressed by carbon dioxide being contained in 3 ml or less in the negative electrode.

In addition, all of the batteries according to Examples 1 to 9 showed a lower Resistance rise ratio and a higher capacity retention ratio than the batteries according to Comparative Examples 4 to 6. It was shown that the resistance rise was suppressed and the deterioration of the capacity was reduced by containing carbon dioxide in the electrolyte.

Example 4 relates to a battery that does not contain carbon monoxide in the electrolyte. Example 4 showed a lower capacity retention ratio compared to Examples 1 to 3 and 5 to 9. From this, it was shown that the capacity retention ratio was improved by dissolving carbon monoxide together with carbon dioxide in the electrolyte.

In addition, comparison of Examples 7 to 9 showed that Example 9 without aging showed a higher Resistance rise ratio and a lower capacity retention ratio. When aging treatment is performed, it is thought that a coating formation is promoted to result in the suppression of the resistance rise after the cycle and thus a high capacity retention ratio is obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte secondary battery, comprising:
    a positive electrode;
    a negative electrode comprising a negative electrode active material layer; and
    a nonaqueous electrolyte;
    wherein:
        the negative electrode active material layer comprises carbon dioxide and releases the carbon dioxide in the range of 0.01 ml to 3 ml per 1 g of the negative electrode active material layer when heated at 400° C. for 1 minute;
        the nonaqueous electrolyte comprises carbon dioxide in the range of 50 ml to 1000 ml per 1 L; and
        the nonaqueous electrolyte comprises carbon monoxide in the range of 5 ml to 100 ml per 1 L.

2. The battery according to claim 1, wherein the negative electrode active material layer comprises a lithium titanium composite oxide.

3. The battery according to claim 2, wherein the nonaqueous electrolyte comprises propylene carbonate and diethyl carbonate.

4. The battery according to claim 1, wherein the nonaqueous electrolyte comprises propylene carbonate and diethyl carbonate.

5. A method for producing a nonaqueous electrolyte secondary battery, the method comprising:
    washing a negative electrode active material powder with water;
    drying the washed negative electrode active material powder under heating in an inert gas atmosphere;
    preparing a slurry containing the negative electrode active material powder after the heating, in an atmosphere of a dew point of −15° C. or less;
    producing a negative electrode by using the slurry, in an atmosphere of a dew point of −15° C. or less;
    dissolving carbon dioxide in a nonaqueous electrolyte at a concentration of 50 ml/L to 1000 ml/L; and
    assembling a nonaqueous electrolyte secondary battery by using the negative electrode, the nonaqueous electrolyte in which carbon dioxide is dissolved, and a positive electrode, in an atmosphere of a dew point of −15° C. or less.

6. The method according to claim 5, further comprising dissolving carbon monoxide in the nonaqueous electrolyte at a concentration of 5 ml/L to 100 ml/L.

7. The method according to claim 6, wherein the heating temperature for the washed negative electrode active material powder is in the range of 450° C. to 750° C.

8. The method according to claim 7, further comprising an aging treatment by assembling a nonaqueous electrolyte secondary battery and maintaining the battery at a temperature range of 10° C. to 65° C. for a period of one hour to one week.

9. The method according to claim 6, further comprising an aging treatment by assembling a nonaqueous electrolyte secondary battery and maintaining the battery at a temperature range of 10° C. to 65° C. for a period of one hour to one week.

10. The method according to claim 5, wherein the heating temperature for the washed negative electrode active material powder is in the range of 450° C. to 750° C.

11. The method according to claim 10, further comprising an aging treatment by assembling a nonaqueous electrolyte secondary battery and maintaining the battery at a temperature range of 10° C. to 65° C. for a period of one hour to one week.

12. The method according to claim 5, further comprising an aging treatment by assembling a nonaqueous electrolyte secondary battery and maintaining the battery at a temperature range of 10° C. to 65° C. for a period of one hour to one week.

13. The method according to claim 5, wherein the negative electrode active material powder consists of a powder of lithium titanium oxide.

* * * * *